US011851218B1

(12) United States Patent
Hoffman et al.

(10) Patent No.: US 11,851,218 B1
(45) Date of Patent: Dec. 26, 2023

(54) MATERIAL HANDLING APPARATUS

(71) Applicant: Amazon Technologies, Inc., Seattle, WA (US)

(72) Inventors: Brian Stuart Hoffman, Seattle, WA (US); David L. Alspaugh, Seattle, WA (US); Paul Roy Raines, Seattle, WA (US); Timothy Alan Talda, Renton, WA (US); Garett Ochs, Seattle, WA (US); Steven Todd Johnson, Kirkland, WA (US); Seshachalamgupta Motamarri, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 16/579,469

(22) Filed: Sep. 23, 2019

(51) Int. Cl.
| | |
|---|---|
| *B65B 35/24* | (2006.01) |
| *B65B 57/02* | (2006.01) |
| *B65B 35/56* | (2006.01) |
| *B65B 57/14* | (2006.01) |
| *B65G 47/64* | (2006.01) |
| *B65B 57/12* | (2006.01) |
| *B65G 47/53* | (2006.01) |

(52) U.S. Cl.
CPC ............ *B65B 35/24* (2013.01); *B65B 35/56* (2013.01); *B65B 57/02* (2013.01); *B65B 57/14* (2013.01); *B65G 47/646* (2013.01); *B65B 57/12* (2013.01); *B65G 47/53* (2013.01)

(58) Field of Classification Search
CPC ......... B65B 35/24; B65B 35/56; B65B 57/02; B65B 57/06; B65B 57/10; B65B 57/12; B65B 35/58; B65G 47/52; B65G 47/64; B65G 47/644; B65G 47/645; B65G 47/646; B65G 47/647; B65G 47/22; B65G 47/94; B65G 47/46; B65G 47/32; B65G 47/673; B65G 47/945; B65G 47/96; B65G 47/962; B65G 47/965; B65G 13/10; B65G 47/57; B65G 47/8853
USPC ........... 198/361, 369.3, 370.01, 370.04, 394; 193/15, 22, 17, 21, 18; 53/54, 543, 544
See application file for complete search history.

(56) References Cited

U.S. PATENT DOCUMENTS

| | | | | |
|---|---|---|---|---|
| 2,062,604 A | * | 12/1936 | Paxton .................... | B65G 47/54 198/361 |
| 2,901,082 A | * | 8/1959 | Baumann .............. | B65G 47/962 198/360 |
| 2,926,767 A | * | 3/1960 | Bersa ..................... | B65G 47/646 193/38 |
| 2,941,339 A | * | 6/1960 | Salwasser ............... | B65B 35/52 53/247 |
| 2,949,999 A | * | 8/1960 | Sundin ................. | B65G 47/945 198/369.2 |
| 3,034,665 A | * | 5/1962 | Speaker ............... | B65G 47/962 198/349.6 |

(Continued)

*Primary Examiner* — Robert F Long
*Assistant Examiner* — Eduardo R Ferrero
(74) *Attorney, Agent, or Firm* — Kilpatrick Townsend & Stockton LLP

(57) ABSTRACT

A material handling apparatus for reorienting and transferring inventory items to a packaging device includes a support member and a packaging conveyor. The support member receives an inventory item and reorients the item to a rejection orientation or a packaging orientation. The item is moved onto the packaging conveyor in the packaging orientation and is transported to the packaging device.

20 Claims, 7 Drawing Sheets

(56) References Cited

U.S. PATENT DOCUMENTS

| | | | | |
|---|---|---|---|---|
| 3,265,190 A * | 8/1966 | Boehm | B09B 3/00 | 414/382 |
| 3,275,135 A * | 9/1966 | Niese | B07C 5/20 | 198/861.5 |
| 3,348,678 A * | 10/1967 | Flowers | B65G 47/646 | 209/595 |
| 3,360,106 A * | 12/1967 | Harrison | B65G 47/962 | 414/382 |
| 3,386,563 A * | 6/1968 | Harrison | B65G 47/965 | 198/802 |
| 3,510,014 A * | 5/1970 | Speaker | B65G 47/962 | 198/370.04 |
| 3,566,574 A * | 3/1971 | Salwasser | B65B 5/06 | 53/448 |
| 3,593,493 A * | 7/1971 | Alduk | B65B 21/22 | 53/201 |
| 3,595,366 A * | 7/1971 | Johanski | B65B 35/24 | 198/468.6 |
| 3,619,967 A * | 11/1971 | Alduk | B65B 5/06 | 53/448 |
| 3,628,653 A * | 12/1971 | Warkentin | B65B 35/24 | 198/436 |
| 3,642,113 A * | 2/1972 | Burgis | B65G 47/71 | 198/370.09 |
| 3,655,180 A * | 4/1972 | Holler | B65B 5/06 | 198/429 |
| 3,656,738 A * | 4/1972 | Glaser | B65G 43/00 | 270/58.03 |
| 3,680,681 A * | 8/1972 | Burk | B65G 39/10 | 198/349 |
| 3,732,990 A * | 5/1973 | Suter | B23Q 7/165 | 414/779 |
| 3,815,318 A * | 6/1974 | Lerner | B65B 31/044 | 53/459 |
| 3,865,226 A * | 2/1975 | Scata | B65G 47/962 | 198/802 |
| 3,923,157 A * | 12/1975 | Cavenar | B07C 5/04 | 198/360 |
| 3,939,984 A * | 2/1976 | Butner | B07C 5/3404 | 209/536 |
| 3,945,485 A * | 3/1976 | Speaker | B65G 47/962 | 198/370.04 |
| 3,974,909 A * | 8/1976 | Johnson | B65G 47/962 | 105/272 |
| 4,003,461 A * | 1/1977 | Speaker | B65G 47/80 | 414/744.8 |
| 4,004,681 A * | 1/1977 | Clewett | B65G 47/962 | 198/802 |
| 4,011,155 A * | 3/1977 | Feurstein | B07C 5/3412 | 209/3.1 |
| 4,016,979 A * | 4/1977 | Bibler | B07C 5/14 | 198/369.3 |
| 4,031,998 A * | 6/1977 | Suzuki | B65G 47/962 | 198/802 |
| 4,053,056 A * | 10/1977 | Day | B07C 5/3404 | 209/587 |
| 4,065,007 A * | 12/1977 | Kurahashi | B65G 47/962 | 104/166 |
| 4,067,172 A * | 1/1978 | Paules | B65B 59/00 | 53/53 |
| 4,089,404 A * | 5/1978 | Venzke | B65G 47/962 | 198/802 |
| 4,102,448 A * | 7/1978 | Wolbrink | B65G 47/962 | 105/241.1 |
| 4,114,349 A * | 9/1978 | Jensen | B65B 57/14 | 209/657 |
| 4,146,134 A * | 3/1979 | Keen | B65B 57/14 | 198/399 |
| 4,193,486 A * | 3/1980 | Borzym | B65G 13/12 | 193/35 R |
| 4,261,456 A * | 4/1981 | Scarpa | B65G 47/846 | 198/459.7 |
| 4,274,531 A * | 6/1981 | Whitmore | A23G 7/0037 | 198/397.03 |
| 4,292,878 A * | 10/1981 | Brooks | F41A 9/86 | 89/33.14 |
| 4,349,998 A * | 9/1982 | Covert | B65B 57/02 | 209/597 |
| 4,378,062 A * | 3/1983 | Macrum | B65G 47/962 | 198/802 |
| 4,385,701 A * | 5/1983 | Buckminster | B07C 5/36 | 198/801 |
| 4,422,815 A * | 12/1983 | Danhof | B21D 43/287 | 193/31 A |
| 4,461,378 A * | 7/1984 | Roth | B65G 47/945 | 198/822 |
| 4,474,092 A * | 10/1984 | Mally | B26D 7/0625 | 83/110 |
| 4,517,791 A * | 5/1985 | Focke | B65B 35/58 | 198/374 |
| 4,555,010 A * | 11/1985 | Solund | B65G 47/94 | 193/36 |
| 4,569,434 A * | 2/1986 | Horii | B65G 47/965 | 198/802 |
| 4,625,855 A * | 12/1986 | Klaus | B21D 43/006 | 198/360 |
| 4,703,765 A * | 11/1987 | Paules | B65B 61/08 | 131/112 |
| 4,722,430 A * | 2/1988 | Canziani | B65G 47/962 | 198/374 |
| 4,800,703 A * | 1/1989 | Goodman | B65B 5/08 | 53/244 |
| 4,802,808 A * | 2/1989 | Wolk | B65G 59/067 | 414/789.2 |
| 4,847,487 A * | 7/1989 | Bordini | B65B 57/10 | 250/223 R |
| 4,982,828 A * | 1/1991 | Nicolson | B65G 47/962 | 198/802 |
| 5,024,316 A * | 6/1991 | Scata | B65G 15/24 | 198/369.3 |
| 5,101,982 A * | 4/1992 | Gentili | B07C 5/18 | 177/145 |
| 5,133,445 A * | 7/1992 | Spatafora | B65B 57/10 | 198/398 |
| 5,136,826 A * | 8/1992 | Carson | B65B 5/06 | 53/247 |
| 5,141,095 A * | 8/1992 | Kamp | B65H 67/064 | 198/409 |
| 5,176,244 A * | 1/1993 | Radzins | B65G 47/846 | 414/798.6 |
| 5,181,597 A * | 1/1993 | Geerts | B65G 17/18 | 198/477.1 |
| 5,335,767 A * | 8/1994 | Killer | B07C 3/082 | 198/370.04 |
| 5,381,882 A * | 1/1995 | Ostholt | B65G 47/962 | 198/802 |
| 5,477,955 A * | 12/1995 | Madden | B07B 13/16 | 209/912 |
| 5,489,017 A * | 2/1996 | Bonnet | B65G 47/962 | 198/370.04 |
| 5,497,887 A * | 3/1996 | Hiebert | B07C 5/36 | 209/912 |
| 5,522,512 A * | 6/1996 | Archer | B65B 57/14 | 209/580 |
| 5,533,315 A * | 7/1996 | Van Dam | B07C 5/3404 | 53/53 |
| 5,568,715 A * | 10/1996 | Ebel | B65B 25/008 | 53/54 |
| 5,575,712 A * | 11/1996 | Krewer | B65B 35/24 | 53/251 |
| 5,626,238 A * | 5/1997 | Blanc | B65G 47/52 | 209/912 |
| 5,632,589 A * | 5/1997 | Bray | B61C 11/04 | 198/349.6 |
| 5,644,895 A * | 7/1997 | Edwards | B29C 65/18 | 53/55 |
| 5,720,593 A * | 2/1998 | Pleake | A21C 15/00 | 209/698 |

(56) References Cited

U.S. PATENT DOCUMENTS

| | | | | |
|---|---|---|---|---|
| 5,810,149 A * | 9/1998 | Sandberg | ................ | B65G 47/52 |
| | | | | 198/369.2 |
| 5,836,436 A * | 11/1998 | Fortenbery | .......... | B65G 47/962 |
| | | | | 198/805 |
| 5,878,863 A * | 3/1999 | Madden | ................ | B65G 47/965 |
| | | | | 209/912 |
| 5,967,290 A * | 10/1999 | Bonnet | ................ | B65G 47/715 |
| | | | | 198/370.1 |
| 5,979,633 A * | 11/1999 | Bonnet | ................ | B65G 19/02 |
| | | | | 198/370.09 |
| 5,990,437 A * | 11/1999 | Coutant | ................ | B65G 47/965 |
| | | | | 209/3.3 |
| 6,012,566 A * | 1/2000 | Nilsson | ................ | B65G 47/962 |
| | | | | 198/474.1 |
| 6,061,996 A * | 5/2000 | Vissers | .................. | B65B 5/105 |
| | | | | 198/411 |
| 6,135,262 A * | 10/2000 | Polling | ................ | B65G 47/962 |
| | | | | 198/370.04 |
| 6,227,357 B1 * | 5/2001 | Brown, Sr. | ............. | B25H 1/04 |
| | | | | 198/861.1 |
| 6,231,293 B1 * | 5/2001 | Ostholt | ................ | B65G 17/46 |
| | | | | 414/418 |
| 6,247,576 B1 * | 6/2001 | Bonnet | ................ | B65G 47/965 |
| | | | | 198/370.04 |
| 6,349,526 B1 * | 2/2002 | Newman | .................. | B07C 5/10 |
| | | | | 53/143 |
| 6,374,984 B1 * | 4/2002 | Nagler | .................. | B07C 5/361 |
| | | | | 177/1 |
| 6,508,351 B1 * | 1/2003 | Christoffersen | ........ | B65B 35/58 |
| | | | | 198/394 |
| 6,533,099 B2 * | 3/2003 | Bonham | ................ | B65G 47/44 |
| | | | | 209/916 |
| 6,536,599 B1 * | 3/2003 | Nielsen | ................ | A22C 25/12 |
| | | | | 209/540 |
| 6,554,123 B2 * | 4/2003 | Bonnet | ................ | B65G 17/345 |
| | | | | 209/559 |
| 6,712,194 B1 * | 3/2004 | Abildgaard | .......... | B65G 47/962 |
| | | | | 198/370.04 |
| 6,827,198 B1 * | 12/2004 | Costanzo | ............ | B65G 47/945 |
| | | | | 198/370.04 |
| 6,905,030 B2 * | 6/2005 | Ratesic | ................ | G01G 15/00 |
| | | | | 209/645 |
| 6,910,849 B2 * | 6/2005 | Bertuzzi | ................ | B65B 35/58 |
| | | | | 414/789.2 |
| 7,028,723 B1 * | 4/2006 | Alouani | ................ | G16H 70/40 |
| | | | | 141/83 |
| 7,334,378 B2 * | 2/2008 | Noumi | ...................... | B65B 1/46 |
| | | | | 53/53 |
| 8,215,543 B2 * | 7/2012 | Carson | ................ | G07F 11/1657 |
| | | | | 235/375 |
| 9,715,030 B1 * | 7/2017 | SaavedraSilvia | ....... | D06F 93/00 |
| 10,227,151 B2 * | 3/2019 | Kawano | ................ | B65B 53/02 |
| 2002/0056607 A1 * | 5/2002 | Bonnet | ................ | B65G 47/962 |
| | | | | 198/370.06 |
| 2002/0166752 A1 * | 11/2002 | Takahashi | ............. | B65G 21/10 |
| | | | | 198/369.2 |
| 2003/0136086 A1 * | 7/2003 | Kalany | .................. | B65G 54/02 |
| | | | | 53/443 |
| 2003/0145723 A1 * | 8/2003 | Blackman | ................ | F16J 10/02 |
| | | | | 92/128 |
| 2003/0148724 A1 * | 8/2003 | Shefet | .................... | B65G 47/54 |
| | | | | 452/32 |
| 2003/0183482 A1 * | 10/2003 | Boller | ................ | B65G 47/965 |
| | | | | 198/360 |
| 2004/0016678 A1 * | 1/2004 | Bertleff | ................ | B65G 47/71 |
| | | | | 209/1 |
| 2004/0028777 A1 * | 2/2004 | Koke | .................... | B65B 25/065 |
| | | | | 426/129 |
| 2005/0135917 A1 * | 6/2005 | Kauppila | ............. | B65G 47/252 |
| | | | | 414/758 |
| 2005/0172800 A1 * | 8/2005 | Uchino | ................ | F15B 15/1447 |
| | | | | 92/54 |
| 2005/0274589 A1 * | 12/2005 | Groot | .................... | B65G 21/18 |
| | | | | 198/370.04 |
| 2005/0281662 A1 * | 12/2005 | Carey | ................ | B65G 47/248 |
| | | | | 198/395 |
| 2006/0260908 A1 * | 11/2006 | Affaticati | ............. | B65G 47/962 |
| | | | | 198/370.04 |
| 2006/0271237 A1 * | 11/2006 | Kim | ...................... | B65B 61/24 |
| | | | | 700/226 |
| 2007/0207714 A1 * | 9/2007 | Gebhart | ............. | B28B 11/0818 |
| | | | | 451/463 |
| 2009/0025344 A1 * | 1/2009 | Moske | .................... | B65G 47/244 |
| | | | | 53/459 |
| 2009/0277133 A1 * | 11/2009 | Yokota | .................... | B65B 35/36 |
| | | | | 53/244 |
| 2010/0115887 A1 * | 5/2010 | Schroeder | ............... | B65B 57/02 |
| | | | | 53/396 |
| 2011/0262603 A1 * | 10/2011 | Blattner | ................ | B65B 25/067 |
| | | | | 426/323 |
| 2012/0228085 A1 * | 9/2012 | Sjogren | ............. | B65G 47/2445 |
| | | | | 198/415 |
| 2012/0325623 A1 * | 12/2012 | Polling | ................ | B65G 47/248 |
| | | | | 198/411 |
| 2014/0083062 A1 * | 3/2014 | Arimatsu | ................ | B65B 35/56 |
| | | | | 53/564 |
| 2014/0091013 A1 * | 4/2014 | Streufert | ................ | B65G 47/46 |
| | | | | 209/552 |
| 2014/0224906 A1 * | 8/2014 | Dunn | ...................... | B02C 23/08 |
| | | | | 241/64 |
| 2015/0298175 A1 * | 10/2015 | Kennedy | ................ | B07B 13/16 |
| | | | | 198/370.03 |
| 2017/0121122 A1 * | 5/2017 | Blanc | .................... | B65G 47/248 |
| 2017/0336194 A1 * | 11/2017 | Foulk | .................... | B23P 19/041 |
| 2017/0349383 A1 * | 12/2017 | Myers | ................ | B65G 47/5104 |
| 2018/0070595 A1 * | 3/2018 | McCafferty | ........... | B65B 53/063 |
| 2018/0264521 A1 * | 9/2018 | Chapelet | ................ | B07C 1/16 |
| 2020/0354164 A1 * | 11/2020 | Fujio | ................ | B65G 43/08 |

* cited by examiner

MATERIAL HANDLING APPARATUS

BACKGROUND

Automatic packaging devices can be employed to package an item for shipping. In some existing approaches, an item is manually inspected and fed into the automatic packaging device. Manually feeding an item into the automatic packaging device, however, may result in erroneous inclusion of another item(s) in a package or the item being damaged during the packaging process. Additionally, manually feeding items into the automatic packaging device may inhibit operation of the automatic packing device at full capacity.

BRIEF DESCRIPTION OF THE DRAWINGS

Various embodiments in accordance with the present disclosure will be described with reference to the drawings, in which.

DETAILED DESCRIPTION

Figure 1:
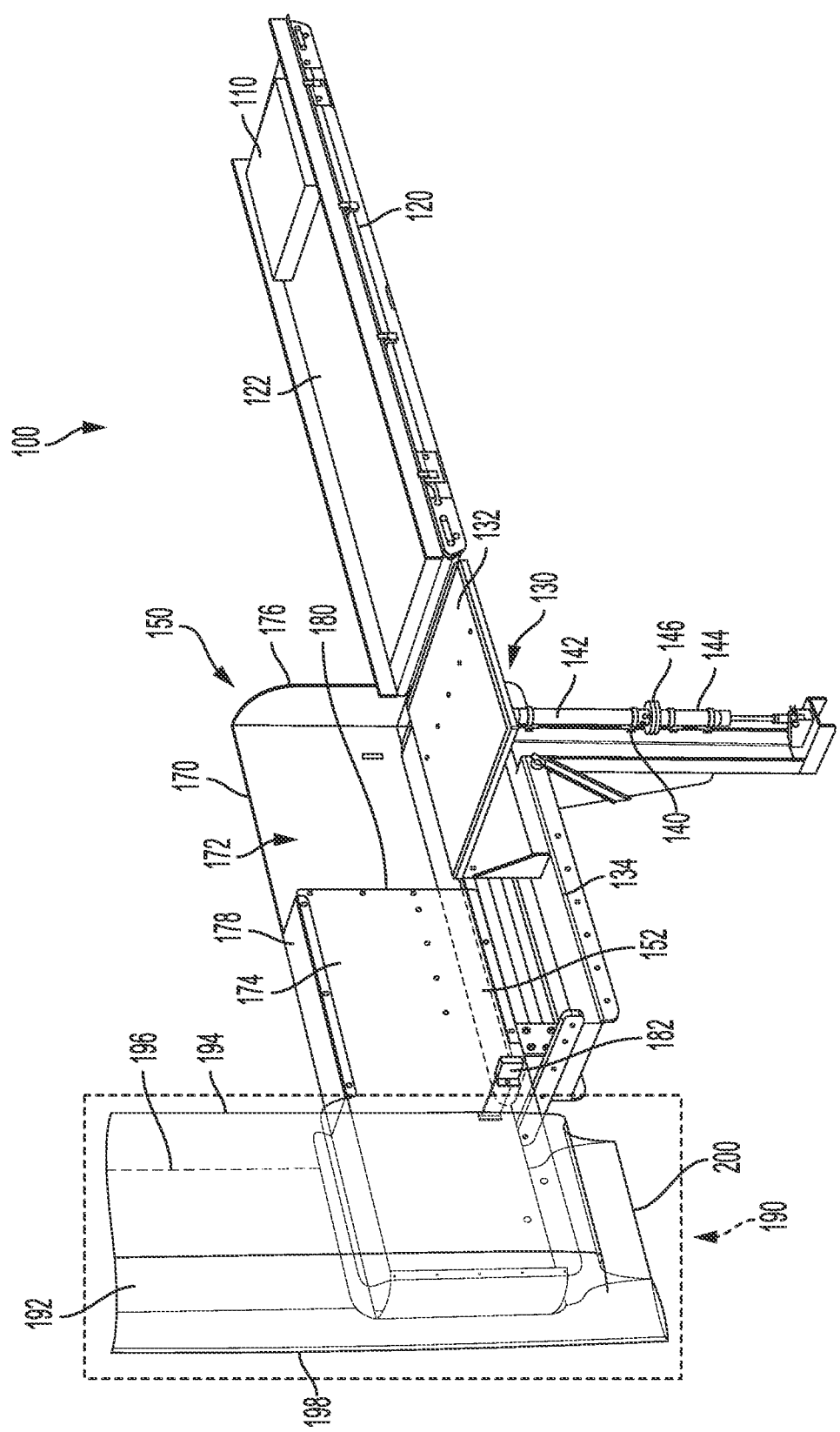
FIG. 1 illustrates a material handling apparatus, in accordance with embodiments, for supplying items to a packaging apparatus.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a material handling apparatus for supplying items to an automatic packaging device. In many embodiments, the material handling apparatus is configured to receive the item in a receiving orientation, automatically reorient the item from the receiving orientation to a packaging orientation, and insert the item into the automatic packaging device in the packaging orientation. In some embodiments, the material handling apparatus includes a packaging conveyor that is configured to insert the item into the automatic packaging device in the packaging orientation. In such embodiments, the packaging conveyor can include a conveyor belt assembly that is reconfigurable between an insertion configuration in which the conveyor belt assembly extends into the automatic packaging device for insertion of the item into the automatic packaging device and a retraction configuration in which the conveyor belt assembly accommodates packaging and conveyance of the item by the automatic packaging device. The item can be associated with an online order received from a purchaser. For example, a purchaser can place an online order for one or more items. The purchased items can be found in a warehouse and transferred to the material handling apparatus for insertion into the automatic packaging device. In some embodiments, the material handling apparatus includes an input conveyor on which the item is placed in the receiving orientation. The input conveyor conveys the item onto a support member that is controllably reoriented to reconfigure the support member from a receiving configuration to a packaging configuration to reorient the item from the receiving orientation to the packaging orientation, and transfer the item in the packaging configuration to the packaging conveyor. The packaging conveyor conveys the item in the packaging orientation and inserts the item into the automatic packaging device. In some embodiments, the material handling apparatus includes an item position sensor that generates a signal indicative of a position of the item relative to a distal end of the packaging conveyor.

In some embodiments, the material handling apparatus is controllable to selectively remove an item from the material handling apparatus to prevent delivery of the item to the automatic packaging device. For example, in some embodiments, in response to an item having a rejection status, the support member is controllably reoriented to reconfigure the support member from the receiving configuration to a rejection configuration that results in the item being removed from the support member. For example, in the rejection configuration the support member can have a sufficient angle relative to horizontal to cause the item to slide off the support member via gravity. The rejected item removed from the support member can then be routed for suitable processing of the rejected item. In some embodiments, the material handling apparatus is configured to receive status data associated with the item and process the data to determine whether to reconfigure the support member to transfer the item to the packaging conveyor for insertion into the automatic packaging device or to reconfigure the support member to remove the item from the material handling device for routing and/or processing of the item.

Referring now to the drawings in which similar identifiers refer to similar elements, FIG. 1 illustrates a material handling apparatus 100 for supplying items to a packaging apparatus 190. The material handling apparatus 100 includes an input conveyor 120, a reorientation/sorting station 130, and a packaging conveyor assembly 150. The input conveyor 120 can receive an item 110 in a receiving orientation and convey the item 110 to the reorientation/sorting station 130. The reorientation/sorting station 130 can reorient the item 110. The reorientation/sorting station 130 can reorient the item 110 to a rejection orientation or a packaging orientation. In the rejection orientation, the item 110 can be removed from the material handling apparatus 100. In the packaging orientation, the item 110 can be transferred to the packaging conveyor assembly 150. The packaging conveyor assembly 150 can transport the item 110 to the packaging apparatus 190.

Item 110 can be goods or inventory purchasable by a purchaser. In various embodiments, the item 110 may be ordered by a purchaser through an online portal. For example, the item 110 may be a plastic action figure, a dog toy, or a watch purchased through the online portal. The item 110 can be retrieved from a warehouse environment, transported to the material handling apparatus 100, and deposited onto the input conveyor 120. The item 110 can be oriented in a receiving orientation, a rejection orientation, or a packaging orientation. The receiving orientation can correspond to the orientation of the item 110 when it is set on the input conveyor 120 and/or the reorientation/sorting station 130. In some embodiments, the receiving orientation can be the same or similar to the rejection orientation and/or the packaging orientation. As an illustrative example, the item 110 has a receiving orientation with the smallest dimension being the height of the item. Additionally or alternatively, in the packaging orientation, the item 110 can be oriented with the smallest dimension being the width of the item.

The input conveyor 120 can transport the item 110 from the warehouse environment to the reorientation/sorting station 130. The input conveyor 120 can receive the item 110 in the receiving orientation. The input conveyor 120 may include components for orienting the item 110 to the receiving orientation. The input conveyor 120 can include an input conveyor belt 122 that receives the item 110. The input conveyor 120 can convey the item 110 from the warehouse environment to the reorientation/sorting station 130. The input conveyor 120 can be or include components of a belted motor driven roller assembly, motor drive rollers, a conveyor, a robot, a drone, and/or other devices suitable for transporting the item 110.

In some embodiments, the input conveyor 120 can be coupled with sensors (not shown) for detecting item data associated with the item 110. The sensors can detect the item data while the item 110 is on the input conveyor 120. The item data can be detected while the item 110 is being conveyed by the input conveyor 120. Additionally or alternatively, the item data can be detected while the input conveyor 120 has stopped conveying the item 110. The item data can be output to one or more computer systems. The item data can be used to determine how to reorient the item 110. In some embodiments, the item data includes the condition of the item, a barcode, a label, a weight, an item dimension, or an orientation of the item 110.

In some embodiments, the input conveyor 120 can include one or more components (not shown) for reorienting the item 110 to an optimized receiving orientation. For example, the input conveyor 120 can include components that orient the item 110 to have the smallest dimension being the height of the item.

The reorientation/sorting station 130 can receive the item 110 from the input conveyor 120. The reorientation/sorting station 130 can include a support member 132, a frame assembly 134, and an actuator assembly 140. In the illustrated embodiment, the support member 132 is a rectangular panel having four perimeter edges. The support member 132 is mounted to frame assembly 134 for selective rotation. The actuator assembly 140 includes a first linear actuator 142 and a second linear actuator 144 that are serially and fixedly connected via an intermediate connection 146. As described herein, controlled selective extension/retraction of the first linear actuator 142 and/or the second linear actuator 144 can be used to reconfigure the support member 132 between a receiving configuration for receiving the item 110 from the input conveyor, a packaging configuration for transferring the item to the packaging conveyor assembly 150 in a packaging orientation, and a rejection configuration for removal of the item from the material handling apparatus 100.

The packaging conveyor assembly 150 can be reconfigured between a first configuration and a second configuration. In the first configuration, the packaging conveyor assembly 150 can receive item 110 in the packaging orientation. In the second configuration, the packaging conveyor assembly 150 can accommodate packaging and conveyance of the item 110 by the packaging device 190. In some embodiments, the first configuration can be an extension configuration. Additionally or alternatively, the second configuration can be a retraction configuration. However, the first configuration and/or the second configuration can be any suitable configuration of the conveyor assembly 150.

In various embodiments, the packaging conveyor assembly 150 can receive the item 110 in the retraction configuration and convey the item to the packaging apparatus 190 at the same time the conveyor assembly 150 is reconfigured from the retraction configuration to the extension configuration. However, the conveyor assembly 150 may receive the item 110 in the retraction configuration and reconfigure to the extension configuration before conveying the item. Additionally or alternatively, the packaging conveyor assembly 150 can receive the item 110 when the packaging conveyor assembly is configured in the extension configuration. In the extension configuration, the packaging conveyor assembly 150 can extend into the packaging device 190 for insertion of the item 110 into the packaging device 190. In various embodiments, the packaging conveyor assembly 150 can convey the item 110 to a shelf, a tote, a conveyor, or another suitable component for receiving the item.

The packaging conveyor assembly 150 includes a conveyor belt assembly 152 and a conveyance channel assembly 170. The conveyance channel assembly 170 includes backside vertical panel 172, a front side vertical panel 174, a proximal end panel 176, and a top panel 178. The proximal end panel 176 extends perpendicular to the backside vertical panel 172. The top panel 178 is attached to a top end segment of the backside vertical panel 172 and to a top end segment of the front side vertical panel 174, thereby coupling the top end segment of the backside vertical panel 172 to the top end segment of the front side vertical panel 174. The conveyor belt assembly 152 is attached to a bottom end segment of the backside vertical panel 172 and to a bottom end segment of the front side vertical panel 174, thereby coupling the bottom end segment of the backside vertical panel 172 to the bottom end segment of the front side vertical panel 174. The backside vertical panel 172, the front side vertical panel 174, and the top panel 178 can be coupled using fasteners, welding, adhesives, or a similar joining method. The combination of the conveyor belt assembly 152 and the conveyance channel assembly 170 form a conveyance channel 180 along which the item is conveyed via operation of the conveyor belt assembly 152 for insertion of the item into a packaging apparatus 190.

In various embodiments, the conveyance channel assembly 170 includes an item position sensor 182. The item position sensor 182 can detect a position of the item 110 relative to the distal end of the conveyor belt assembly 152. The position of the item 110 relative to the distal end of the conveyor belt assembly 152 can be used to determine how far to convey the item 110 into packaging 192. The item position sensor 182 can be coupled to the front side vertical panel 174, the backside vertical panel 172, or the top panel 178. The item position sensor 182 can be or include a laser, a light gate, a scanner, an RFID reader, or a mechanical sensor.

In some embodiments, the item position sensor 182 and/or one or more additional sensors can detect the height of the item 110 in the packaging configuration. The one or more sensors can include an array of light emitters and corresponding light detectors arranged at different heights to detect the height of the item 110. For example, as the item 110 is conveyed to the end of the conveyor belt assembly 152, the item can pass between the array of light emitters and the light detectors, blocking the light. The height of the item 110 can be determined based on the height of the last light emitter/detector pair that was blocked.

The packaging apparatus 190 can receive the item 110 from the packaging conveyor assembly 150. The packaging apparatus 190 can package the item 110 in packaging 192. As an illustrative example, the packaging 192 has a first side 194 connected to an opposing second side 196 via back seal 198. The first side 194 and the second side 196 can be held apart by the backside vertical panel 172 and the front side vertical panel 174, creating an opening in packaging 192. The item 110 can be deposited through the opening into packaging 192, adjacent the back seal 198. The item 110 can drop from the conveyor belt assembly 152 into the packaging, adjacent the bottom seal 200. As an illustrative example, the item 110 can be deposited into packaging 192 as close as possible to the junction of the back seal 198 and the bottom seal 200. In various embodiments, the item 110 is conveyed a set distance. However, in some embodiments, data associated with the item 110 can be used to optimize the depositing of the item into packaging 192. For example, using the position of the item 110 relative to the distal end of the conveyor belt assembly 152, the distance the item needs to be conveyed into the packaging 192 can be determined. The distance the item 110 needs to be conveyed into the packaging 192 can be optimized so that the item travels to the back seal 198 without the conveyor belt assembly 152 causing the item to impact the back seal 198 and/or with the item lightly impacting the back seal 198. In some embodiments, the height of the item 110 in the packaging configuration can be used to determine where to position the bottom seal 200 in relation to the distal end of the conveyor belt assembly 152. For example, the bottom seal 200 can be positioned to optimize the size of the packaging 192 based on the height of the item 110.

In various embodiments, the conveyance channel assembly 170 can be reconfigured between a first configuration and a second configuration. In the first configuration, the conveyance channel assembly 170 can be external to the packaging apparatus 190. In the second configuration, the conveyance channel assembly 170 can be positioned within the packaging apparatus 190. In some embodiments, when the conveyance channel assembly 170 is positioned within the packaging apparatus 190, the first side of the packaging 194 and the second side of the packaging 196 can be held apart by the backside vertical panel 172 and the front side vertical panel 174 respectively. The conveyance channel assembly 170 can be attached to packaging conveyor assembly 150. The conveyance channel assembly 170 can be reconfigured while the conveyor assembly 150 is reconfigured from the retraction configuration to the extension configuration. In some embodiments, the conveyance channel assembly 170 is reconfigurable independently from the conveyor assembly 150. The conveyance channel 170 can be or include conveyors. In some embodiments, the conveyance channel assembly 170 can be a U-shaped channel.

In various embodiments, the conveyance channel assembly 170 can include a surface and/or a treatment that can allow packaging 192 to move against the conveyance channel assembly without being damaged. For example, the conveyance channel assembly 170 can include a moveable surface.

In various embodiments, the material handling apparatus 100 can include a second reorientation/sorting station (not pictured) that mirrors the reorientation/sorting station 130. The second reorientation/sorting station can reorient the item 110 from the receiving orientation to the packaging orientation. A second input conveyor (not pictured) can transport item 110 to the second reorientation/sorting station. The second input conveyor can transport the item 110 to the second reorientation/sorting station in the conveyance orientation. However, the input conveyor 120 can transport item 110 to the reorientation/sorting station 130 or the second reorientation/sorting station.

In some embodiments, the conveyance channel assembly 170 can include one or more sliding panels. The sliding panels can accommodate items 110 transferred from the reorientation/sorting station 130 and/or the second reorientation/sorting station. For example, to receive item 110 from the reorientation/sorting station 130, the conveyance channel assembly 170 can be configured as shown in FIG. 1, with a portion of the front side vertical panel 174 having an opening and the backside vertical panel 172 being closed. To receive an item 110 from the second reorientation/sorting station, a portion of the front side vertical panel 174 can slide to cover the open portion where item 110 was received. A portion of the backside vertical panel 172 can then open to receive an item 110 from the second reorientation/sorting station 130.

Figure 2:
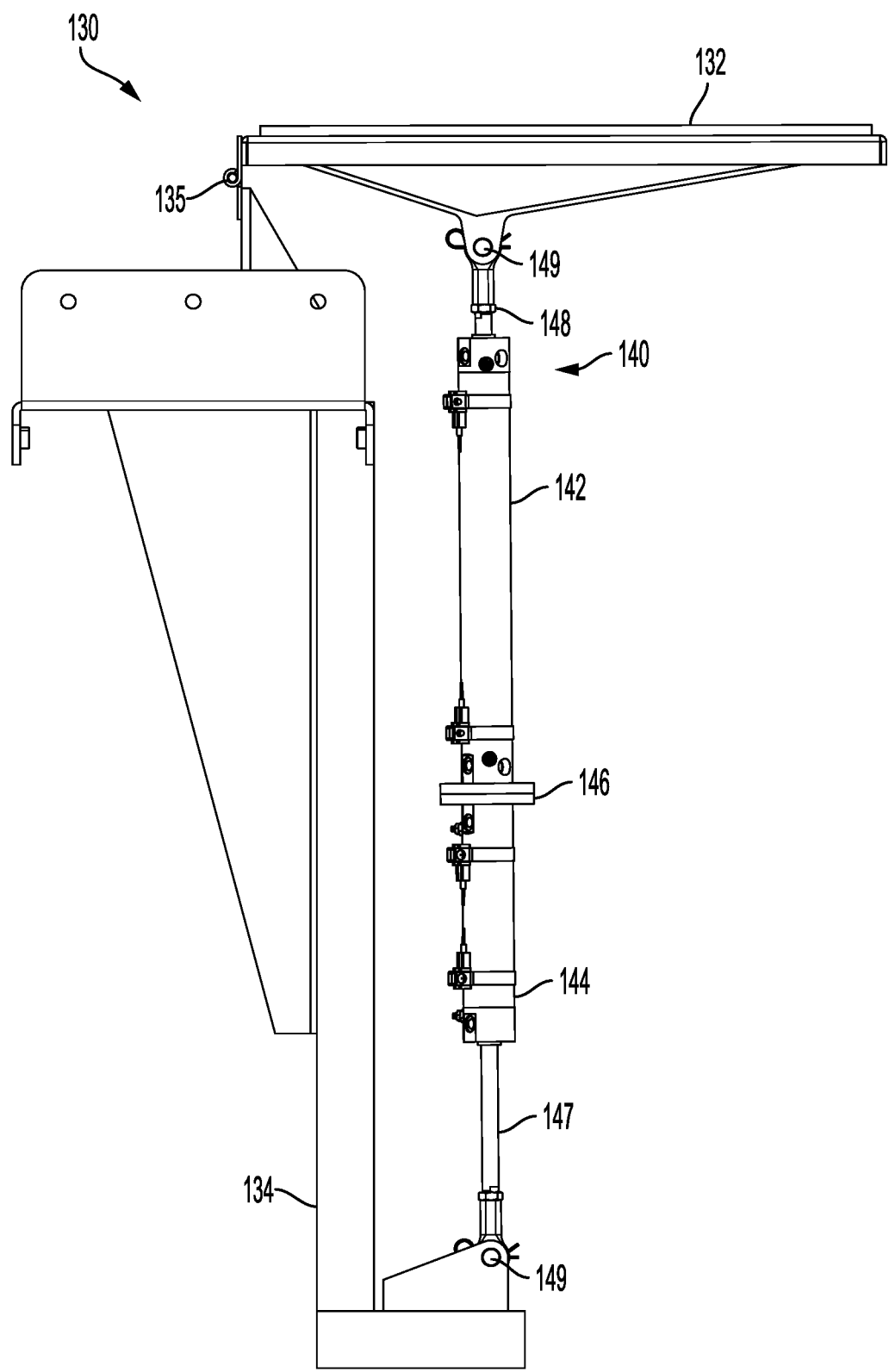
FIG. 2 illustrates a reorientation/sorting station that can be included in particular embodiments of the material handling apparatus of FIG. 1.

FIG. 2 illustrates a reorientation/sorting station 130 that can be included in particular embodiments of the material handling apparatus 100 of FIG. 1. The reorientation/sorting station 130 includes support member 132, frame assembly 134, and actuator assembly 140. Support member 132 is pivotally mounted to the frame assembly 134 for selective rotation of the support member 132 around a pivot axis 135. The pivot axis 135 is aligned with and positioned adjacent to the perimeter edge of the support member 132 disposed closest to the packaging conveyor assembly 150. The support member 132 can be mounted to the frame assembly 134 with a hinge.

The actuator assembly 140 includes a first linear actuator 142 and a second linear actuator 144 that are serially and fixedly connected via an intermediate connection 146. The first linear actuator 142 has an upper end 148 that is pivotally connected to the support member 132 via fastener 149. The second linear actuator 144 has a lower end 147 that is pivotally coupled with the frame assembly 134 via fastener 149.

Figure 3:
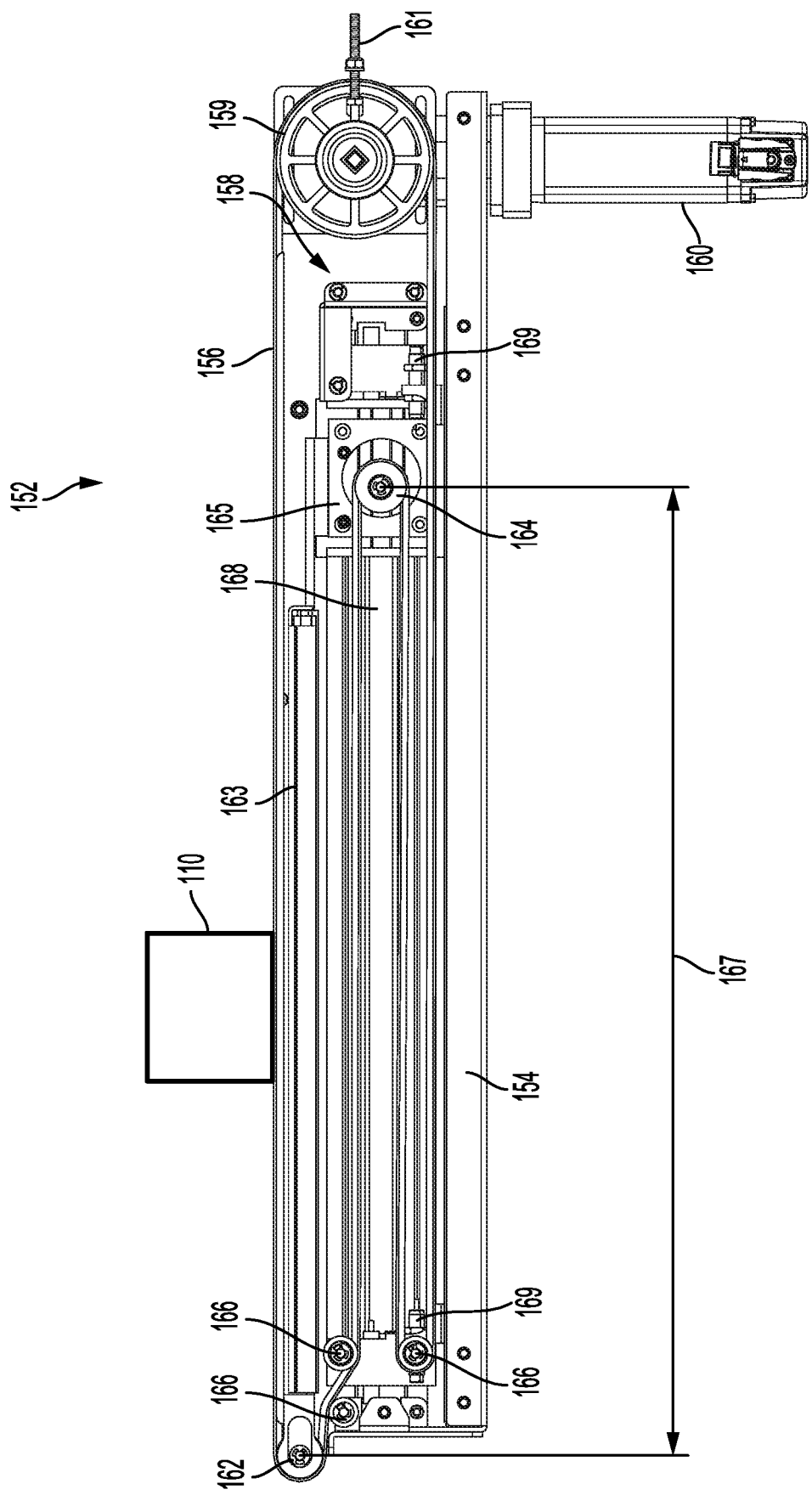
FIG. 3 illustrates an example conveyor belt assembly that can be included in particular embodiments of the material handling apparatus of FIG. 1.

FIG. 3 illustrates an example conveyor belt assembly 152 that can be included in particular embodiments of the material handling apparatus 100 of FIG. 1. The conveyor belt assembly 152 can be reconfigurable between an extension configuration in which the conveyor belt assembly 152 extends into the packaging device 190 for insertion of the item 110 into the packaging device and a retraction configuration in which the conveyor belt assembly accommodates packaging and conveyance of the item by the packaging device. The conveyor belt assembly 152 includes housing 154, conveyance surface 156, and drive assembly 158. The conveyor belt assembly 152 can be or include an extendable/retractable conveyor or a telescopic conveyor belt.

Housing 154 can protect the conveyance surface 156 and drive assembly 158 from objects in the warehouse environment. Housing 154 can be coupled with the frame assembly 134 to maintain correct positioning of the conveyor belt assembly 152. Housing 154 can be or include sheet metal, plastic, or similar material.

Conveyance surface 156 can receive item 110 from the reorientation/sorting station 130. The conveyance surface 156 can convey the item 110 from the reorientation/sorting station 130 to the packaging apparatus 190. The conveyance surface 156 can be or include material that provides friction between the conveyance surface and the item 110. In some embodiments, the conveyance surface can be or include a rubber belt. In various embodiments, the conveyance surface 156 can be or include a continuous conveyor belt. However, the conveyance surface 156 may be a fixed conveyor belt.

Drive assembly 158 can include drive wheel 159, motor 160, front roller 162, take-up roller 164, idler rollers 166 and an actuator 168. The drive assembly 158 can be used to selectively reconfigure the conveyor belt assembly 152 between a retraction configuration and an insertion configuration. Drive wheel 159 can rotate about a central axis to articulate the conveyance surface 156. The central axis of the drive wheel 159 can be square for interfacing with a square drive rod. The drive wheel 159 can couple with the conveyance surface 156 via teeth or a similar interfacing component that grips the conveyance surface. The drive wheel 159 can be or include a plastic of metal wheel.

In some embodiments, the drive assembly can include one or more springs (not shown). The springs can provide a constant tension to the drive assembly 158 while the conveyor belt assembly 152 is reconfigured between the extension configuration and the retraction configuration. The springs allow a constant tension to be applied to the drive assembly 158 without needing a dedicated tensioning device. The springs can be or include constant force springs. The constant force springs can be positioned in a pair with a back to back mounting configuration.

Motor 160 can be coupled with and rotate the drive wheel 159. The motor 160 can be coupled with the drive wheel 159 via a drive rod. The motor 160 can be or include an electric motor, an actuator, or a brushless motor.

In some embodiments, the motor 160 and/or the drive wheel 159 can be coupled with tensioner 161. Tensioner 161 can move the motor 160 and/or the drive wheel 159 relative to front roller 162. Tensioner 161 can be used to increase or decrease the tension of conveyance surface 156. In some embodiments, tensioner 161 is the only tensioning component in the drive assembly 158 that can be adjusted to change the tension of the conveyance surface 156.

The front roller 162, take-up roller 164 and idler rollers 166 can be used to maintain alignment of the conveyance surface 156 during articulation of the conveyance surface. The front roller 162, take-up roller 164, and idler rollers 166 can freely rotate about an axis in response to articulation of the conveyance surface 156. As shown, three idler rollers 166 are used in the drive assembly 158, however, more or less can be included in the drive assembly. Additionally or alternatively, one or more of the front roller 162, the take-up roller 164, or the idler rollers 166 can be replaced with a driven roller.

The front roller 162 and take-up roller 164 can be coupled with actuator 168. Front roller 162 can be coupled with actuator 168 via rod 163. Take-up roller 164 can be coupled with actuator 168 via mounting plate 165. The actuator 168 can move front roller 162 and take-up roller 164 to selectively reconfigure conveyor belt assembly 152. In some embodiments, the actuator can be or include a pneumatic actuator, a hydraulic cylinder, an electric actuator, a motor, a pneumatic cylinder, or a pneumatic ram.

In the retracted configuration, a portion of the conveyance surface 156 is stored within housing 154. In the insertion configuration, the portion of the conveyance surface 156 that was stored within housing 154 is external to housing 154 and can be used to convey item 110. The front roller 162 and take-up roller 164 can be coupled with actuator 168 and spaced apart by distance 167. Distance 167 remains unchanged when the conveyor belt assembly 152 is reconfigured between the retracted configuration and the insertion configuration. The conveyor belt assembly 152 can be reconfigured while articulation of the conveyance surface 156 is stopped. As an illustrative example, the item 110 can be conveyed to a distal end of the conveyor belt assembly 152 when the conveyor belt assembly is in the insertion configuration. The articulation of the conveyor belt assembly 152 can be stopped. The conveyor belt assembly 152 can be reconfigured between the insertion configuration and the retracted configuration. The item 110 can fall from the conveyor belt assembly 152 while remaining at the distal end of the conveyor belt assembly.

In some embodiments, the length of the conveyor belt assembly 152 in the insertion configuration can be adjusted using one or more dampers 169. The dampers 169 can adjust the position of the take-up roller 164, the front roller 162, and/or the idler rollers 166. Adjusting the take-up roller 164 and/or the front roller 162 can change distance 167, which can change the length of the conveyor belt assembly 152 in the extension configuration. For example, moving take-up roller 164 towards front roller 162 can reduce distance 167 and reduce the length of the conveyor belt assembly 152 in the extension configuration.

In some embodiments, the packaging conveyor assembly 150 can be or include a reciprocating conveyor 152. The reciprocating conveyor 152 can include a servo-driven conveyor belt with a pneumatically actuated end position. The reciprocating conveyor 152 can receive the item 110 from the reorientation/sorting station 130. The reciprocating conveyor 152 can extend and convey the item 110 to the end of the extended conveyor. The reciprocating conveyor 152 can retract from the extend position without rotating the belt, removing the item 110 from the conveyor without pushing the item. The reciprocating conveyor 152 can extend into the packaging device 190 for depositing the item 110 into the packaging device. In some embodiments, the reciprocating conveyor 152 can convey the item 110 to a shelf, a tote, a conveyor, or another suitable component for receiving the item.

FIG. 4 through FIG. 8 are simplified side view schematic illustrations of operational states of the material handling apparatus 100 of FIG. 1. FIG. 4 through FIG. 8 depict a single item 110 moving through the material handling apparatus 100, however, multiple items can be moved through the system simultaneously.

Figure 4:
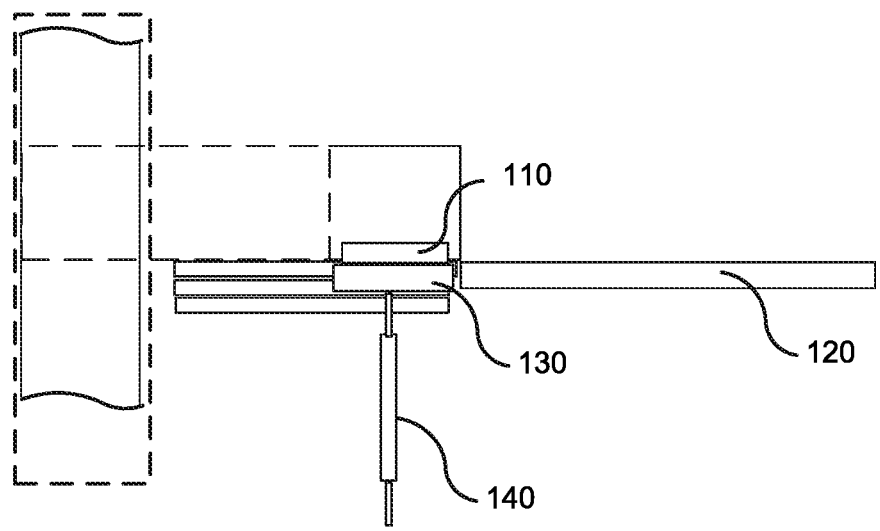
FIG. 4 through FIG. 8 are simplified side view schematic illustrations of operational states of the material handling apparatus of FIG. 1.
Figure 5:
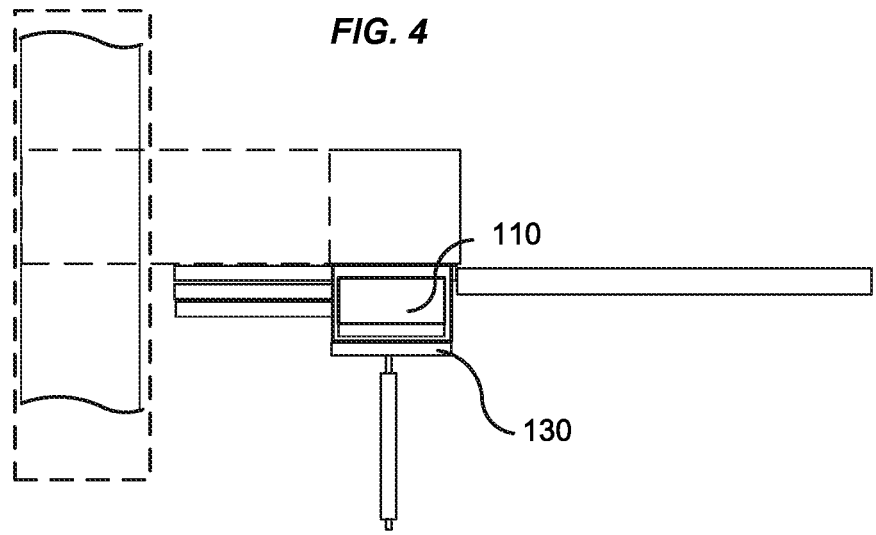
Figure 6:
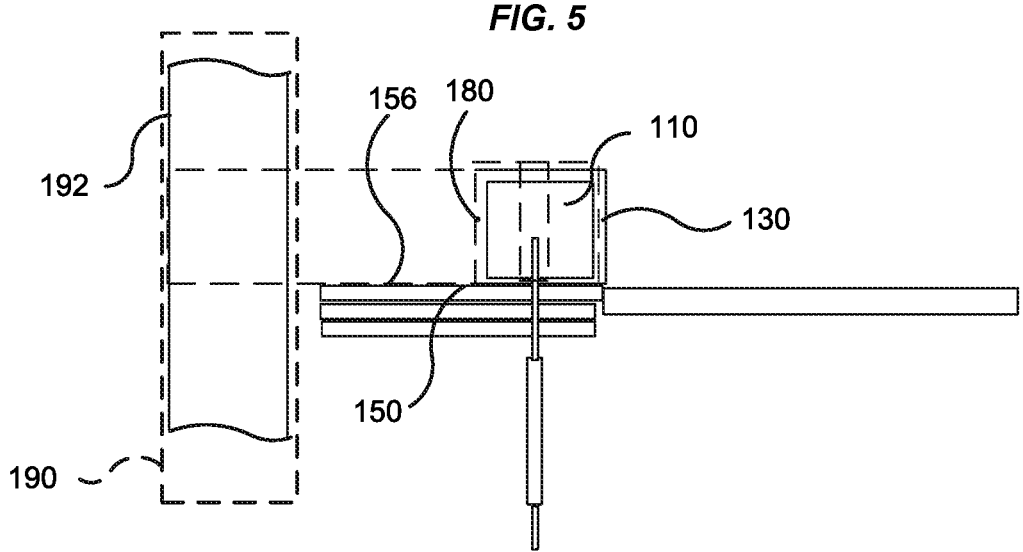

In FIG. 4 the material handling apparatus 100 receives the item 110 on the reorientation/sorting station 130. The reorientation/sorting station 130 can receive item 110 in a receiving configuration. The item 110 can be received from a warehouse environment and transported to the reorientation/sorting station 130 by input conveyor 120. However, the item 110 may be deposited directly onto the reorientation/sorting station 130. The item 110 can be deposited onto the reorientation/sorting station 130 in a receiving orientation. The actuator assembly 140 can reconfigure the reorientation/sorting station 130 from the receiving configuration to the rejection configuration (FIG. 5). Alternatively, the actuator assembly 140 can reconfigure the reorientation/sorting station 130 from the receiving configuration to the packaging configuration (FIG. 6). As discussed further below, a computer system can be coupled with actuator assembly 140 for selective reconfiguration of the reorientation/sorting station 130.

In FIG. 5, the reorientation/sorting station 130 is configured in the rejection configuration. In the rejection configuration, the reorientation/sorting station 130 can reorient the item 110 from the receiving orientation to the rejection orientation. In the rejection orientation, the item 110 can be removed from the material handling apparatus 100. In some embodiments, the item 110 in the rejection orientation can be transferred from the reorientation/sorting station 130 to a conveyor. However, in some embodiments, in the rejection configuration the reorientation/sorting station 130 can have a sufficient angle relative to horizontal to cause the item 110 to slide off the reorientation/sorting station via gravity.

In FIG. 6, reorientation/sorting station 130 is configured in the packaging configuration. In the packaging configuration, the reorientation/sorting station 130 can reorient the item 110 to the packaging orientation. In the packaging orientation, the item 110 can be transferred to the packaging conveyor assembly 150. The packaging conveyor assembly 150 can receive the item 110 in conveyance channel 180. In the conveyance channel 180, the item 110 can sit on the conveyance surface 156.

Figure 7:
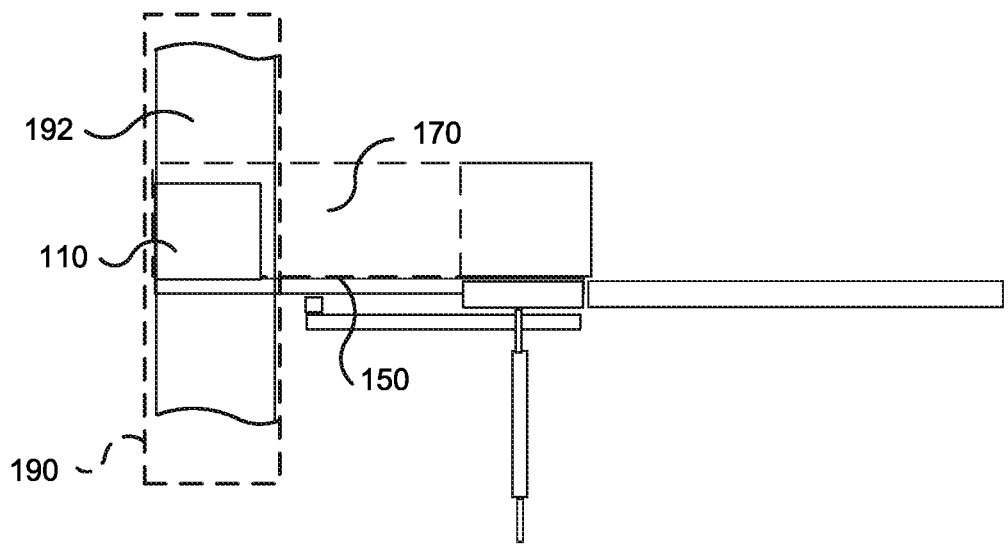

In FIG. 7, the item 110 has been conveyed by the packaging conveyor assembly 150 from the reorientation/sorting station 130 to the packaging apparatus 190. The item 110 may contact one or more walls of the conveyance channel assembly 170 as the item is conveyed from the reorientation/sorting station 130 to the packaging apparatus 190. The item 110 can be conveyed by the packaging conveyor assembly 150 in the packaging orientation. In some embodiments, the packaging conveyor assembly 150 receives the item 110 when the packaging conveyor is configured in the retraction configuration. The packaging conveyor assembly 150 can convey the item 110 to the packaging apparatus 190 while the packaging conveyor assembly is reconfigured from the retraction configuration to the insertion configuration. The packaging conveyor assembly 150 may be reconfigured from the retraction configuration to the insertion configuration before the item 110 is conveyed to the packaging apparatus 190. The packaging conveyor assembly 150 can extend into the packaging apparatus 190. The item 110 can be conveyed to the distal end of the packaging conveyor assembly 150.

Figure 8:
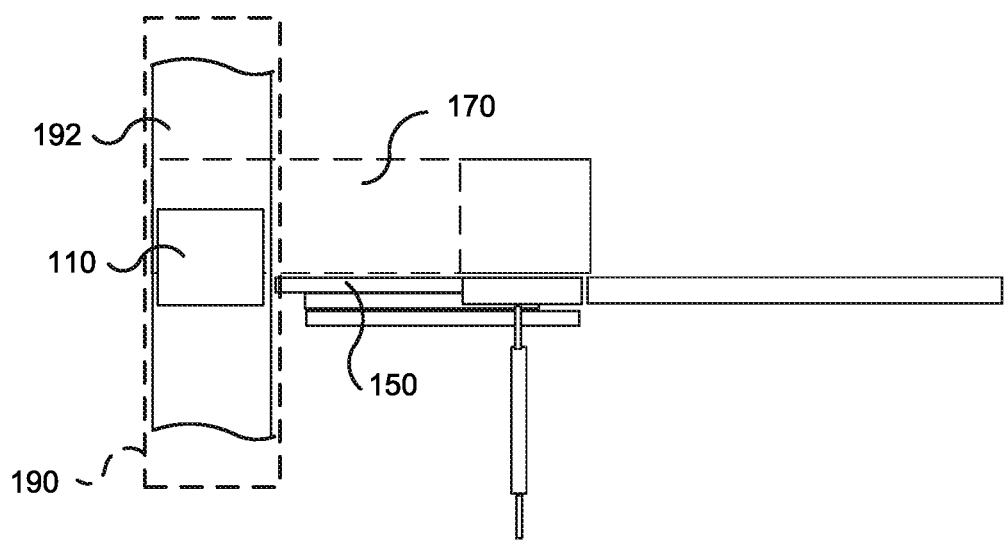

In FIG. 8, the packaging conveyor assembly 150 can deposit the item 110 into packaging apparatus 190. The item 110 can reach the distal end of the packaging conveyor assembly 150 in the packaging orientation. The packaging conveyor assembly 150 can be reconfigured from the insertion configuration to the retraction configuration. The packaging conveyor assembly 150 can be reconfigured while the item 110 remains at the distal end of the packaging conveyor. The item 110 can fall from the distal end of the packaging conveyor assembly 150 while the packaging conveyor is reconfigured from the insertion configuration to the retraction configuration. The item 110 can fall into the packaging apparatus 190. In some embodiments, the item 110 falls directly into packaging 192 contained within the packaging apparatus 190.

Figure 9:
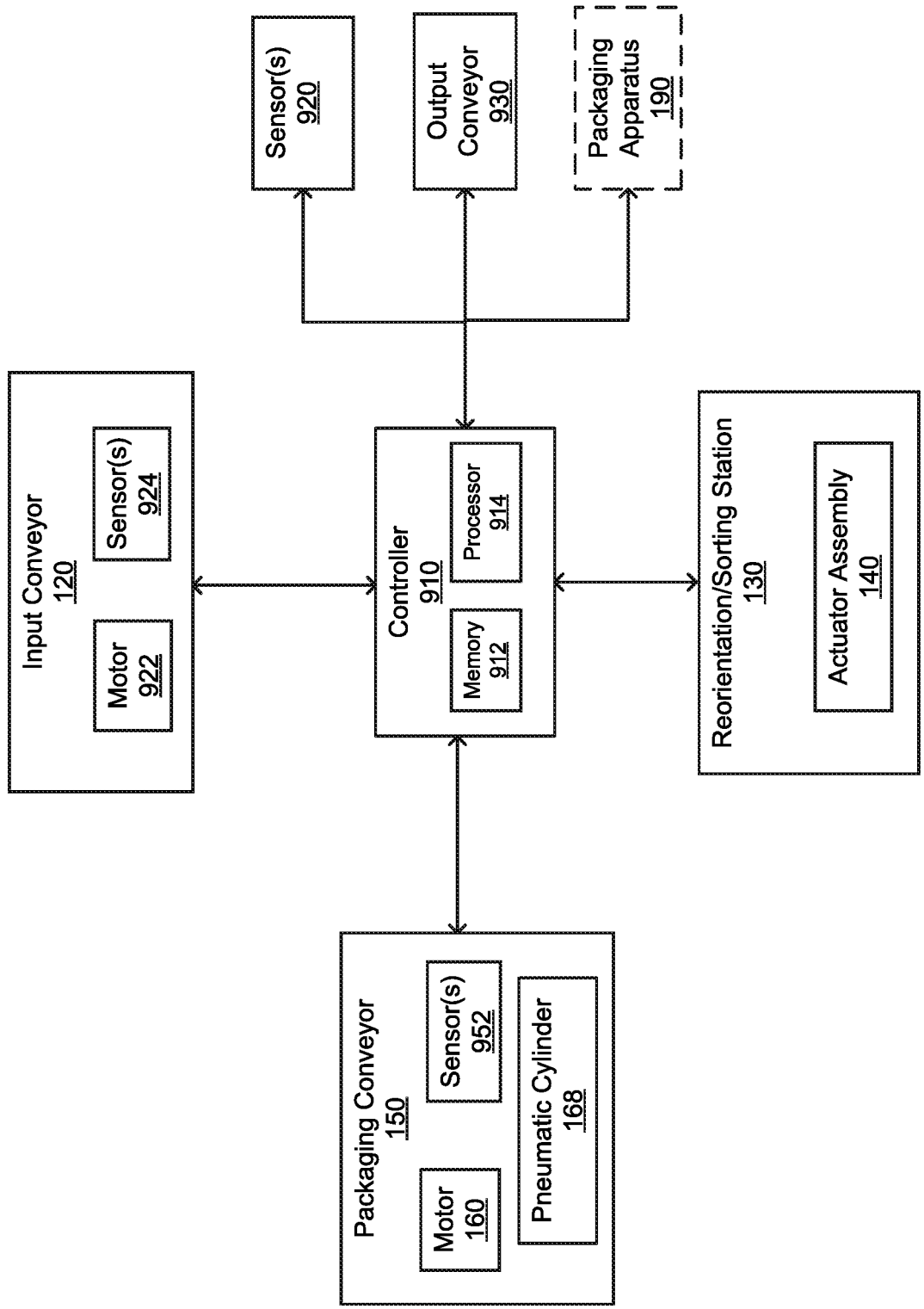
FIG. 9 is a simplified schematic diagram illustrating control aspects of the material handling apparatus of FIG. 1.

FIG. 9 is a simplified schematic diagram illustrating control aspects of the material handling apparatus 100 of FIG. 1. A controller 910 can communicate information and/or instructions associated with the material handling apparatus 100. The controller 910 be in communication with the input conveyor 120, the reorientation/sorting station 130, the packaging conveyor assembly 150, one or more sensors 920, an output conveyor 930, or the packaging apparatus 190. The controller 910 can communicate via a wired or wireless connection (e.g., Bluetooth). The controller 910 can include memory 912 and a processor 914. The memory 912 and the processor 914 can be included in a single structure. However, the memory 912 and processor 914 may be part of a system of multiple interconnected devices.

The memory 912 can include any type of memory device that retains stored information when powered off. The memory 912 can be or include electrically erasable and programmable read-only memory ("EEPROM"), flash memory, or any other type of non-volatile memory. In some examples, at least part of the memory 912 can include a medium from which the processor 914 can read instructions. A non-transitory computer-readable medium can include electronic, optical, magnetic, or other storage devices capable of providing the processor 914 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The processor 914 can execute instructions stored in the memory 912 to perform operations, for example, determining an item status based on item data. The processor 914 can include one processing device or multiple processing devices. Non-limiting examples of the processor 914 include a Field-Programmable Gate Array ("FPGA"), an application-specific integrated circuit ("ASIC"), a microprocessor, etc.

The controller 910 can communicate with the input conveyor 120 to send operating instructions to the input conveyor. The operating instruction can be sent to a motor or motors 922 coupled with the input conveyor 120. The operating instructions can instruct the input conveyor 120 to convey the item 110 to the reorientation/sorting station 130.

In some embodiments, sensor(s) 924 can be coupled with the input conveyor 120 and detect item data. The item data can be output from the sensor(s) 924 to the controller 910. The item data can be processed by the processor 914 and stored in the memory 912. The item data can include the condition of the item, the orientation of the item, labels, barcodes, or packaging of the item. The item data can be used by the controller 910 to determine an item status for an item 110. For example, the controller 910 can receive item data that the item 110 is damaged. The controller 910 can determine the item 110 has an item status of rejected. The item status can be used to determine a configuration for the reorientation/sorting station 130. For example, if the item has an item status of rejected, the controller 910 can send instructions to the actuator assembly 140 to reconfigure the reorientation/sorting station 130 to the rejection configuration. The controller 910 can send instructions to the output conveyor 930 to convey the rejected item 110 away from the material handling apparatus 100.

In some embodiments, the controller 910 can send operating instructions to the packaging conveyor assembly 150. The operating instruction can instruct the motor 160 to begin articulation of the item 110. Additionally or alternatively, the operating instructions can instruct the actuator 168 to reconfigure the packaging conveyor assembly 150 from a retracted state to an extended state. The controller 910 can receive data from sensor(s) 952 coupled with the packaging conveyor assembly 150. For example, the controller 910 can receive data that sensor(s) 952 have detected the item 110 is no longer on the packaging conveyor assembly 150. The controller 910 can send operating instructions to the packaging apparatus 190 to package the item 110.

Figure 10:
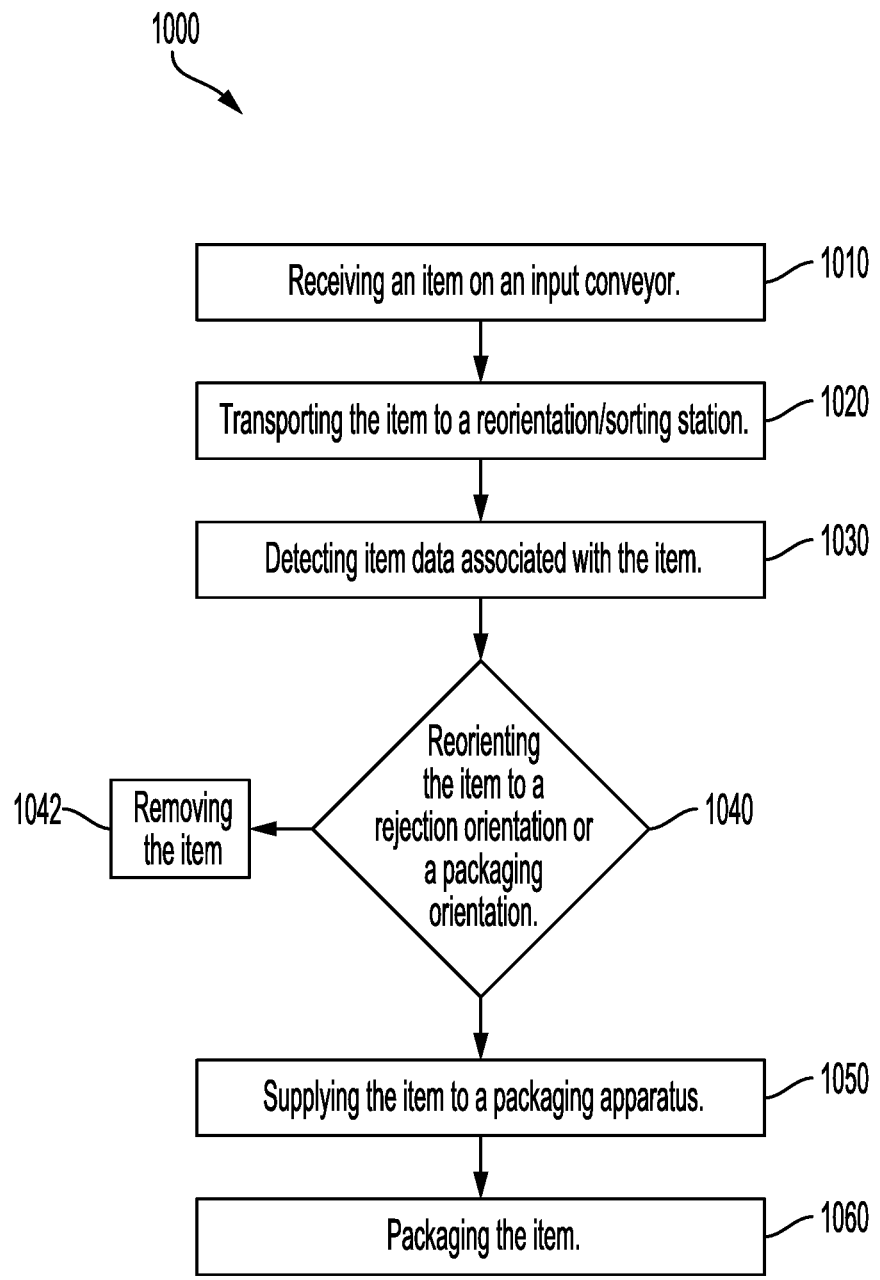
FIG. 10 is a flow chart representing an example of a process for supply an item to a packaging apparatus.

FIG. 10 is a flow chart representing an example of a process 1000 for supplying an item to a packaging apparatus. The item can be, for example, item 110 and the packaging apparatus can be, for example, packaging apparatus 190. The process 1000 can be practiced with material handling apparatus 100 or any suitable devices and approaches, such as those described herein. Some or all of the process 1000 (or any other processes described herein, or variations, and/or combinations thereof) may be performed under the control of one or more computer systems or controllers configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Moreover, unless indicated otherwise, acts shown in the processes are not necessarily performed in the order shown, and/or some acts can be omitted in embodiments.

The process 1000 at 1010 can include receiving an item 110 on an input conveyor 120. The item 110 can be received from a warehouse environment. The item 110 can be received in a receiving orientation.

The process 1000 at 1020 can include transporting the item 110 to a reorientation/sorting station 130. The input conveyor 120 can transport the item 110 from the warehouse environment to the reorientation/sorting station 130. The item can be transported in the receiving orientation. In some embodiments, during transportation to the reorientation/sorting station 130, the item 110 is oriented to the receiving orientation. In some embodiments, the item 110 may be received by the reorientation/sorting station 130 directly.

In some embodiments, the process 1000 at 1030 can include detecting item data associated with the item 110. The item data can be detected by one or more sensors. The item data can be sent to a computer system and stored in memory and/or processed by a processor. The item data can include the condition of the item, a barcode, a label, a weight, item dimension, or an orientation of the item 110.

The process 1000 at 1040 can include reorienting the item to a rejection orientation or a packaging orientation. The reorientation/sorting station 130 can be configured in a receiving configuration and receive the item 110 in a receiving orientation. The reorientation/sorting station 130 can be reconfigured to a rejection orientation and reorient the item 110 to a rejection orientation. Alternatively, the reorientation/sorting station 130 can be reconfigured to a packaging configuration and reorient the item 110 to a packaging orientation. In the packaging orientation, the item 110 can be transferred to a packaging conveyor assembly 150. The item 110 can be reoriented to a rejection orientation or a packaging orientation based on item data.

In some embodiments, the process 1000 at 1042 includes removing the item 110 from the material handling apparatus 100. The item 110 can be removed from the material handling apparatus 100 in the rejection orientation. In some embodiments, the item 110 can be removed from the material handling apparatus 100 by a conveyor.

The process 1000 at 1050 can include supplying the item 110 to a packaging apparatus 190. The item 110 can be supplied to the packaging apparatus 190 by the packaging conveyor assembly 150. The item 110 can be supplied to the packaging apparatus 190 in the packaging orientation. The packaging conveyor assembly 150 can convey the item 110 from the reorientation/sorting station 130 to the packaging apparatus 190. In some embodiments, the packaging conveyor assembly 150 is reconfigured from a retracted state to an extended state while conveying the item 110. However, the packaging conveyor assembly 150 may be in an extended state when the item 110 is being conveyed to the packaging apparatus 190. The packaging conveyor assembly 150 can deposit the item 110 into the packaging apparatus 190. In some embodiments, the item 110 is deposited into packaging 192.

In some embodiments, the process 1000 at 1060 can include packaging the item 110. The item 110 can be packaged by the packaging apparatus 190. The item 110 can be packaged in packaging 192. Packaging 192 can receive the item 110 through a hole in the packaging. The hole can be sealed after receiving the item 110.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A material handling apparatus comprising:
   an input conveyor operable to supply an item in a horizontal configuration in which a bottom surface of the item is in a substantially horizontal orientation;
   a packaging conveyor having an advanceable belt surface operable to receive the item in a vertical configuration in which the bottom surface of the item is in a substantially vertical orientation and supply the item to a packaging apparatus with the item in the vertical configuration;
   a backside vertical panel positioned along the packaging conveyor;
   a base;
   a support member having a first side pivotally coupled with the base to define a rotation axis positioned adjacent to a perimeter edge of the support member disposed closest to the packaging conveyor, the support member rotatable around the rotation axis between a receiving configuration, a rejection configuration, and a packaging configuration; the support member being configured to receive the item in the horizontal configuration from the input conveyor when in the receiving configuration, the support member being rotatable around the rotation axis from the receiving configuration to the rejection configuration such that the item is dropped from the support member in a rejection direction, and the support member being rotatable around the rotation axis from the receiving configuration to the packaging configuration to impart item movement such that (i) the item is reoriented toward the backside vertical panel in a motion that reorients the item away from the horizontal configuration and to the vertical configuration and (ii) the item is transferred in the vertical configuration directly onto the advanceable belt surface of the packaging conveyor and into a position along the backside vertical panel; and
   an actuator assembly drivingly coupled to the support member such that the support member is rotated around the rotation axis in response to operation of the actuator assembly (i) in a first mode between the receiving configuration and the rejection configuration and (ii) in a second mode between the receiving configuration and the packaging configuration.

2. The material handling apparatus of claim 1, wherein:
   the actuator assembly comprises a first linear actuator and a second linear actuator;
   the first linear actuator and the second linear actuator are serially coupled;
   the first linear actuator has a first actuator extended length and a first actuator retracted length;
   the second linear actuator has a second actuator extended length and a second actuator retracted length;
   when the support member is in the receiving configuration, the first linear actuator has the first actuator retracted length and the second linear actuator has the second actuator extended length;
   when the support member is in the rejection configuration, the first linear actuator has the first actuator retracted length and the second linear actuator has the second actuator retracted length; and
   when the support member is in the packaging configuration, the first linear actuator has the first actuator extended length and the second linear actuator has the second actuator extended length.

3. The material handling apparatus of claim 2, wherein:
   the first linear actuator comprises a first pneumatic cylinder; and
   the second linear actuator comprises a second pneumatic cylinder.

4. The material handling apparatus of claim 1, wherein the packaging conveyor comprises a telescopic conveyor belt reconfigurable between a first configuration for receiving the item in a packaging orientation from the support member and a second configuration in which the telescopic conveyor belt is disposed to accommodate packaging and conveyance of the item by the packaging apparatus.

5. The material handling apparatus of claim 4, wherein the telescopic conveyor belt comprises an actuator for reconfiguring the telescopic conveyor belt between the first configuration and the second configuration.

6. The material handling apparatus of claim 1, wherein the packaging conveyor has a conveyance channel through which the item is conveyed.

7. The material handling apparatus of claim 6, wherein:
   the packaging conveyor comprises a first sidewall and a second sidewall;
   the conveyance channel is at least partially defined by the first sidewall and the second sidewall;
   the first sidewall extends into the packaging apparatus and engages a first segment of a packaging material used to package the item so that the first sidewall is disposed between the first segment of the packaging material and the conveyance channel; and
   the second sidewall extends into the packaging apparatus and engages a second segment of the packaging material used to package the item so that the second sidewall is disposed between the second segment of the packaging material and the conveyance channel.

8. A material handling apparatus comprising:
   a packaging conveyor positioned along a backside vertical panel and having an advanceable belt surface operable to receive an item in a vertical configuration in which a bottom surface of the item is in a substantially vertical orientation and supply the item to a packaging apparatus with the item in the vertical configuration;
   a support member having a first side coupled with a base to define a rotation axis positioned adjacent to a perimeter edge of the support member disposed closest to the packaging conveyor, the support member being rotatable around the rotation axis between a receiving configuration and a packaging configuration, the support member being configured to receive the item in a horizontal configuration from an input conveyor when in the receiving configuration, and wherein the support member is rotatable around the rotation axis from the receiving configuration to the packaging configuration to impart item movement such that (i) the item is reoriented toward the backside vertical panel in a motion that reorients the item away from the horizontal configuration and to the vertical configuration and (ii) the item is transferred in the vertical configuration directly onto the advanceable belt surface of the packaging conveyor and into a position along the backside vertical panel; and an actuator assembly drivingly coupled to the support member such that the support member is rotated around the rotation axis between the receiving configuration and the packaging configuration in response to operation of the actuator assembly.

9. The material handling apparatus of claim 8, wherein:
the packaging conveyor comprises a conveyor belt assembly, a first sidewall, and a second sidewall;
the first sidewall and the second sidewall partially define a conveyance channel through which the item is conveyed via operation of the conveyor belt assembly; and
the first sidewall and the second sidewall are configured to maintain the item in the packaging configuration during conveyance of the item through the conveyance channel by the conveyor belt assembly.

10. The material handling apparatus of claim 9, wherein:
the first sidewall extends into the packaging apparatus so that the first sidewall is disposed between a first segment of packaging material used to package the item and the conveyance channel; and
the second sidewall extends into the packaging apparatus so that the second sidewall is disposed between a second segment of packaging material used to package the item and the conveyance channel.

11. The material handling apparatus of claim 9, wherein the conveyor belt assembly is controllably reconfigurable between a first configuration for receiving the item in the vertical configuration from the support member and a second configuration in which the conveyor belt assembly is disposed to accommodate packaging and conveyance of the item by the packaging apparatus.

12. The material handling apparatus of claim 11, wherein the conveyor belt assembly comprises:
a conveyor belt;
a front roller and a take-up roller coupled to the conveyor belt; and
an actuator coupled to the front roller and the take-up roller and operable to reconfigure the front roller and the take-up roller between the first configuration and the second configuration.

13. The material handling apparatus of claim 8, wherein:
the packaging conveyor comprises a conveyor belt and a drive wheel for articulating the conveyor belt; and
the drive wheel is adjustable to adjust tension of the conveyor belt.

14. The material handling apparatus of claim 8, wherein:
the support member is mounted for selective reorientation of the support member between the receiving configuration and a rejection configuration; and
the item is reconfigured from the horizontal configuration to a rejection orientation for removal from the material handling apparatus when the support member is reconfigured from the receiving configuration to the rejection configuration.

15. A method of supplying items to a packaging apparatus, the method comprising:

receiving a first item (i) in a horizontal configuration in which a bottom surface of the first item is in a substantially horizontal orientation, (ii) from an input conveyor, and (iii) onto a support member in a receiving configuration;

operating an actuator assembly coupled to the support member to rotate the support member around a rotation axis defined by a first side of the support member being coupled with a base, the rotation axis positioned adjacent to a perimeter edge of the support member disposed closest to a packaging conveyor, the support member being rotatable around the rotation axis from the receiving configuration to a packaging configuration to reorient the first item toward a backside vertical panel in a motion that reorients the first item away from the horizontal configuration and toward a vertical configuration in which the bottom surface of the first item is in a substantially vertical orientation, and further in response to the support member rotating around the rotation axis, transferring the first item in the vertical configuration from the support member directly onto an advanceable belt surface of the packaging conveyor and into a position along the backside vertical panel; and operating the packaging conveyor to advance the advanceable belt surface of the packaging conveyor to supply the first item in the vertical configuration to a packaging apparatus.

16. The method of claim 15, further comprising:
receiving a second item in a second item receiving orientation from the input conveyor onto the support member in the receiving configuration; and
in response to a rejection status being associated with the second item, operating the actuator assembly to reorient the support member from the receiving configuration to a rejection configuration to reorient the second item from the second item receiving orientation to a second item rejection orientation that causes the second item to be displaced from the support member in the rejection configuration.

17. The method of claim 16, wherein:
the actuator assembly comprises a first linear actuator and a second linear actuator, the first linear actuator being reconfigurable between a first actuator retracted configuration and a first actuator extended configuration, the second linear actuator being reconfigurable between a second actuator retracted configuration and a second actuator extended configuration;
the first linear actuator and the second linear actuator are serially connected;
operating the actuator assembly to reorient the support member from the receiving configuration to the packaging configuration comprises reconfiguring the first linear actuator from the first actuator retracted configuration to the first actuator extended configuration while maintaining the second linear actuator in the second actuator extended configuration; and
operating the actuator assembly to reorient the support member from the receiving configuration to the rejection configuration comprises reconfiguring the second linear actuator from the second actuator extended configuration to the second actuator retracted configuration while maintaining the first linear actuator in the first actuator retracted configuration.

18. The method of claim 16, further comprising detecting the rejection status by at least one of:

using a barcode reader to read a barcode associated with the second item;

processing image data generated via imaging of a label associated with the second item;

detecting a packaging condition of the second item; or detecting an unsuitable orientation of the second item.

19. The method of claim 15, wherein:

the packaging conveyor comprises a conveyor belt assembly; and operating the packaging conveyor to supply the first item in the vertical configuration to the packaging apparatus comprises:

reconfiguring the conveyor belt assembly between a first configuration for receiving the first item in the vertical configuration from the support member and a second configuration in which the conveyor belt assembly is disposed to accommodate packaging and conveyance of the first item by the packaging apparatus; and following insertion of the first item into the packaging apparatus, reconfiguring the conveyor belt assembly from the second configuration to the first configuration.

20. The method of claim 15, wherein supplying the first item in the vertical configuration to the packaging apparatus comprises receiving a signal from a sensor, the signal being indicative of a position of the first item relative to an end of the packaging conveyor.

* * * * *